No. 684,489. Patented Oct. 15, 1901.
P. A. WHITNEY.
MANUFACTURE OF WRENCH JAWS.
(Application filed Apr. 24, 1901.)
(No Model.) 7 Sheets—Sheet 1.
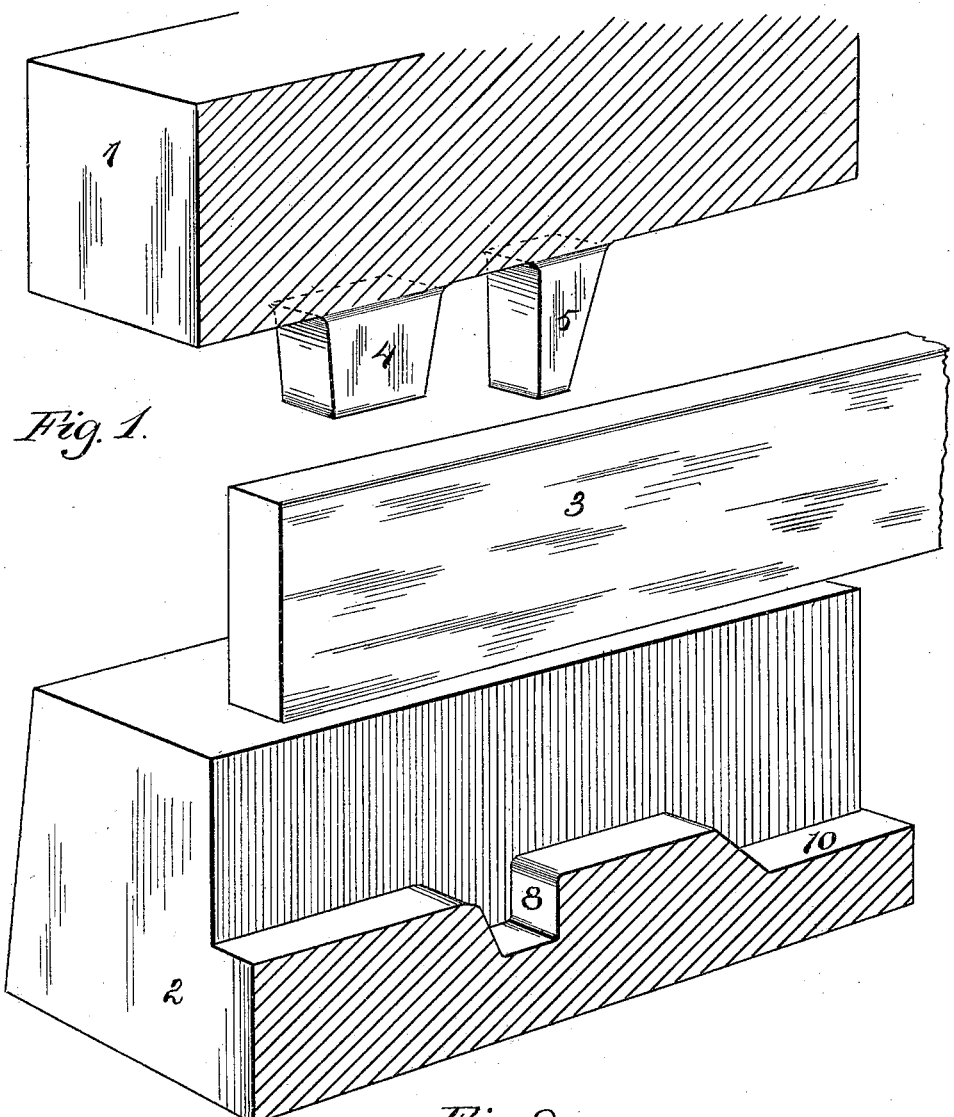
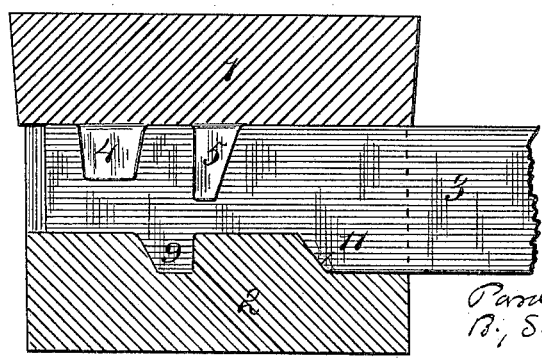
Witnesses
F. M. Bragg
C. F. Kilgore
Inventor
Pardon A. Whitney
B. Simmons & Hart
Attorneys No. 684,489. Patented Oct. 15, 1901.
P. A. WHITNEY.
MANUFACTURE OF WRENCH JAWS.
(Application filed Apr. 24, 1901.)
(No Model.) 7 Sheets—Sheet 2.
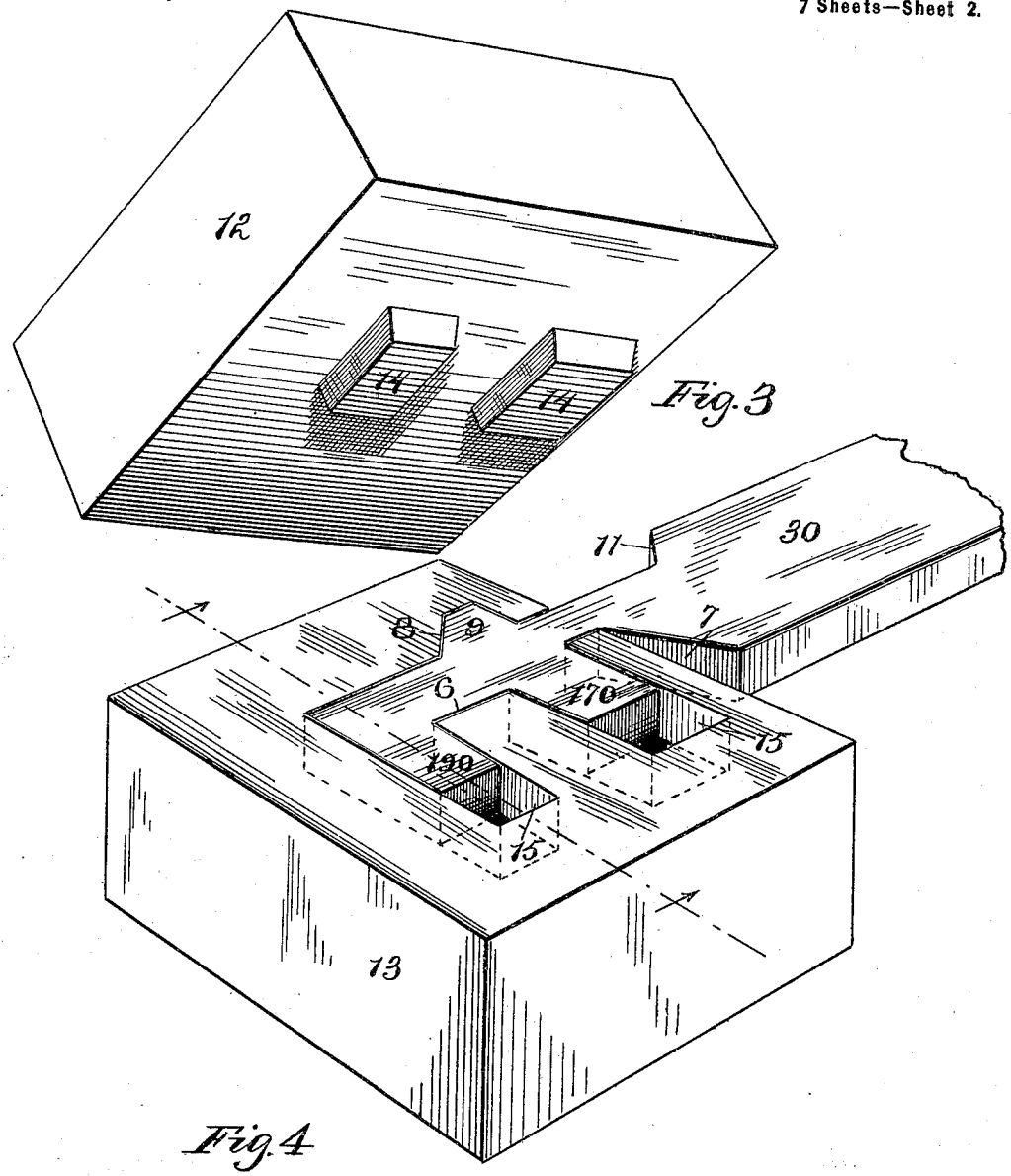
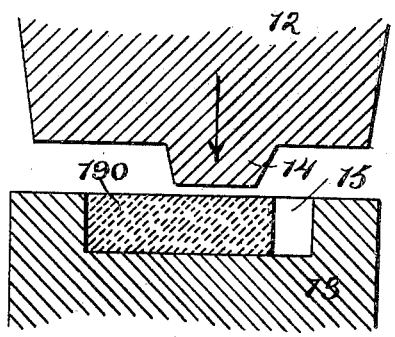

No. 684,489.

P. A. WHITNEY.
MANUFACTURE OF WRENCH JAWS.
(Application filed Apr. 24, 1901.)

Patented Oct. 15, 1901.

(No Model.)

7 Sheets—Sheet 3.

Witnesses
F. M. Bragg
C. F. Kilgore

Inventor
Pardon A. Whitney
By Simonds & Hart
Attorneys.

THE NORRIS PETERS CO., PHOTO-LITHO., WASHINGTON, D. C.

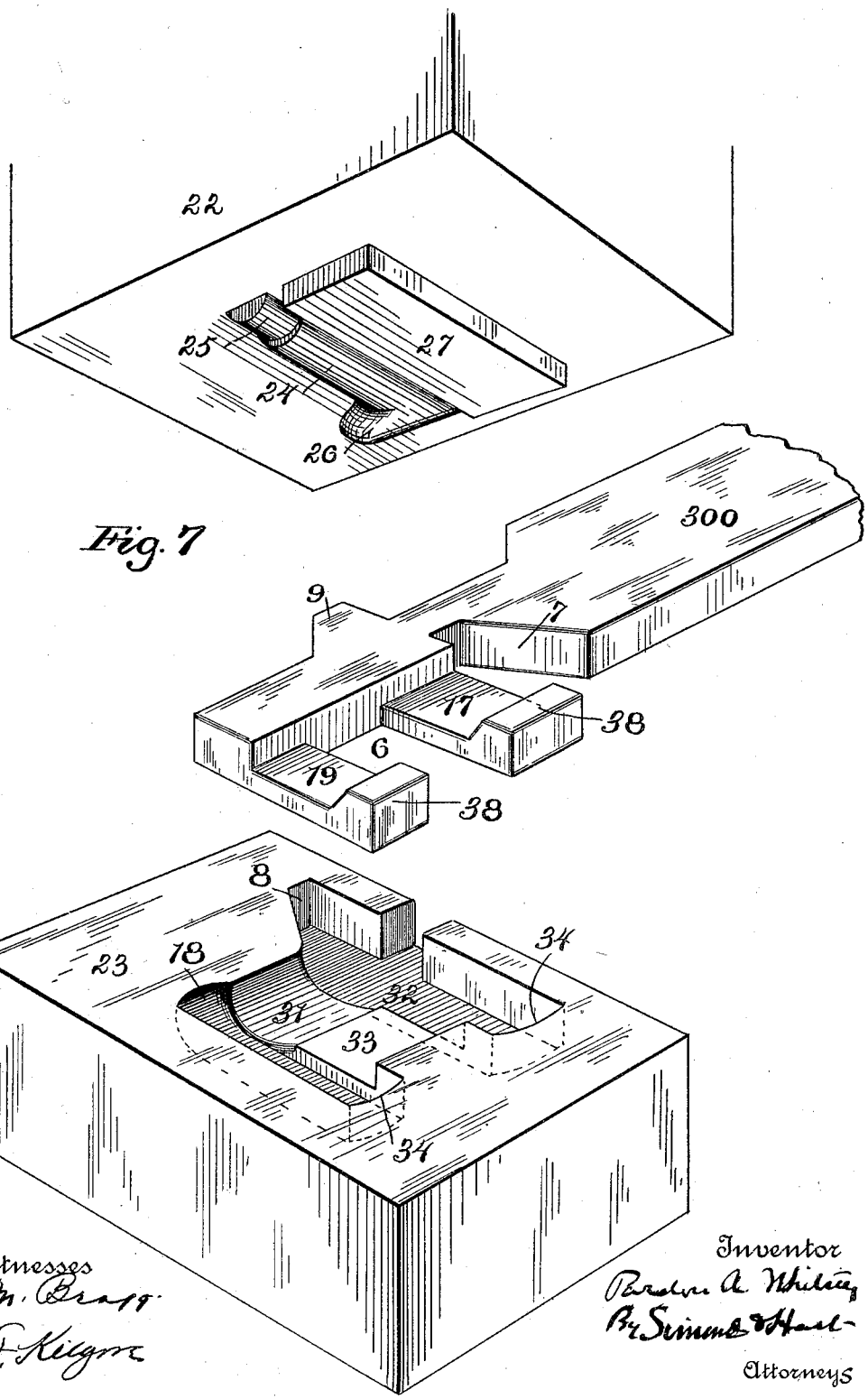

No. 684,489. Patented Oct. 15, 1901.
P. A. WHITNEY.
MANUFACTURE OF WRENCH JAWS.
(Application filed Apr. 24, 1901.)
(No Model.) 7 Sheets—Sheet 5.
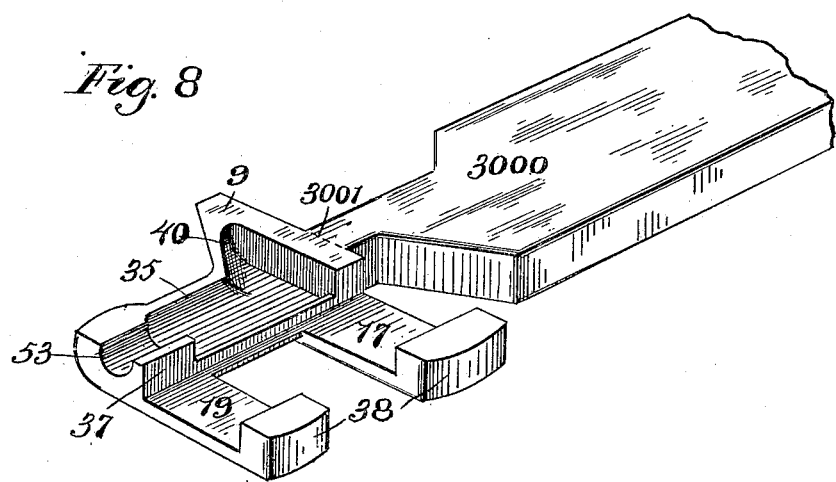
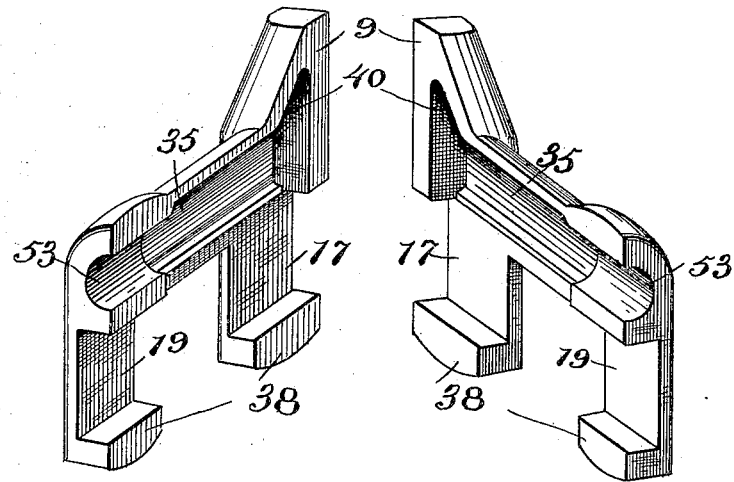
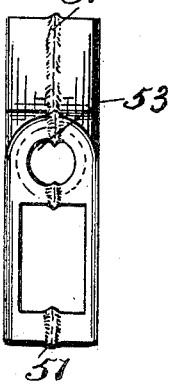
Witnesses
Inventor
Attorneys No. 684,489. Patented Oct. 15, 1901.
P. A. WHITNEY.
MANUFACTURE OF WRENCH JAWS.
(Application filed Apr. 24, 1901.)
(No Model.) 7 Sheets—Sheet 6.
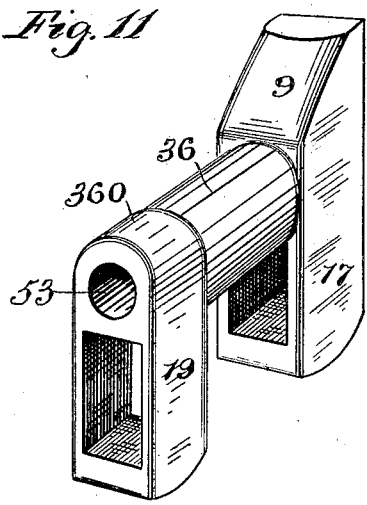
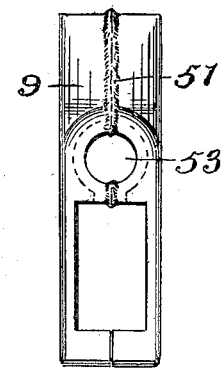
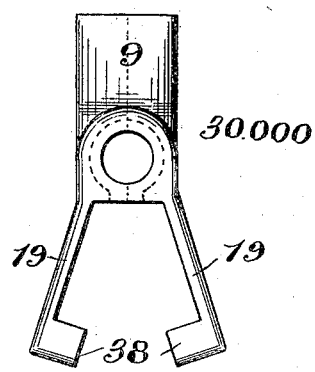
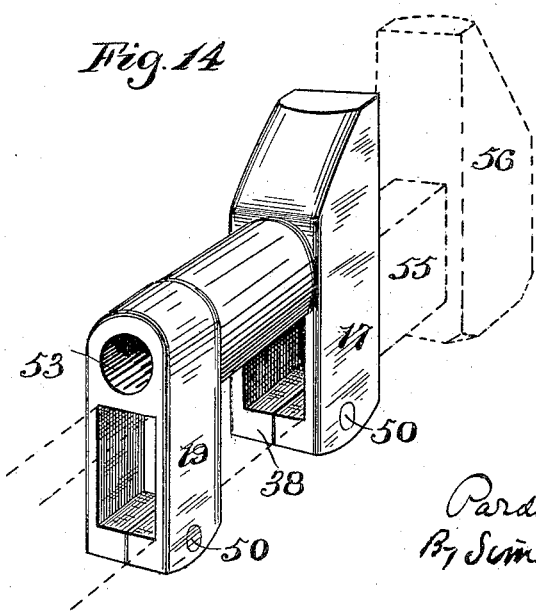

UNITED STATES PATENT OFFICE.

PARDON A. WHITNEY, OF SOUTHINGTON, CONNECTICUT, ASSIGNOR TO THE PECK, STOWE & WILCOX COMPANY, OF SAME PLACE.

MANUFACTURE OF WRENCH-JAWS.

SPECIFICATION forming part of Letters Patent No. 684,489, dated October 15, 1901.

Application filed April 24, 1901. Serial No. 57,326. (No model.)

*To all whom it may concern:*

Be it known that I, PARDON A. WHITNEY, a citizen of the United States of America, residing at Southington, in the county of Hartford and State of Connecticut, have invented a certain new and useful Improvement in the Manufacture of Wrench-Jaws, of which the following is a description, reference being had to the accompanying drawings, wherein—

Figure 5:
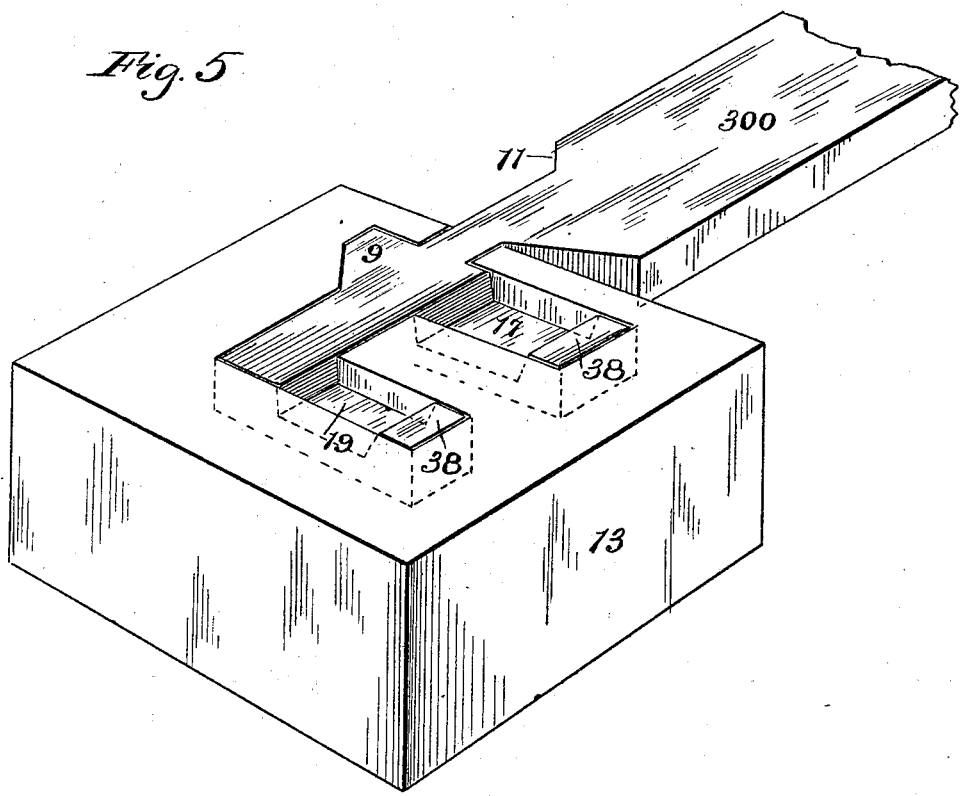
Figure 6:
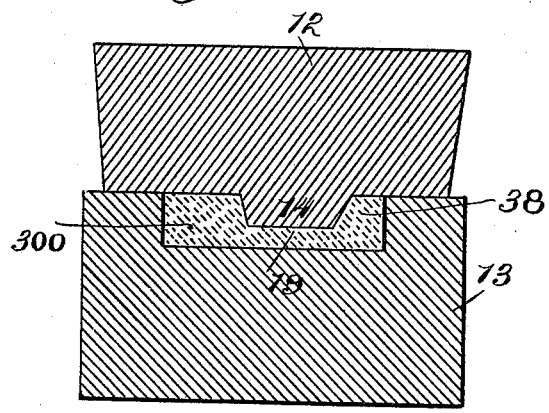
Figure 15:
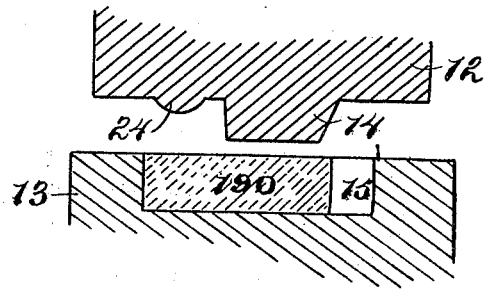
Figure 16:
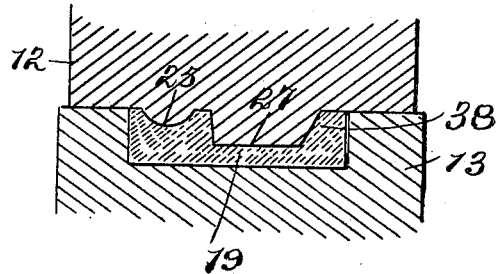
Figure 17:
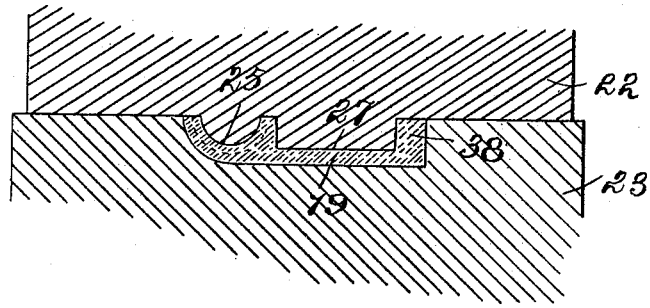

Figure 1 is a view of the first pair of dies made use of in the process herein described, including the original bar of stock, the two dies being shown in vertical longitudinal section. Fig. 2 is a sectional elevation view, on a reduced scale, of the same dies after they have operated upon the stock. Fig. 3 is a view of the second set of dies made use of and with the stock as it comes from the first set of dies therein ready to be operated upon. Fig. 4 is a view in sectional elevation on the plane $xx$, reduced scale, of the same dies that are shown in Fig. 3, including the stock-piece. Fig. 5 is a view of the lower die of the second set shown in Fig. 3 and of the stock after the dies have operated thereon. Fig. 6 is a view similar to Fig. 4 and on a like reduced scale after the dies of the second set have operated. Fig. 7 is a view of the third set of dies and of the stock as it comes from a second set ready to be operated upon by said third set of dies. Fig. 8 is a view of the product of the third set of forgings. Fig. 9 is a view of a pair of the completed wrench-forgings. Fig. 10 is a view of the wrench-forgings of Fig. 9 after they are welded or brazed together. Fig. 11 is a view of what is shown in Fig. 10 after it is made into a complete movable wrench-jaw. Fig. 12 is a view of two of the wrench-forgings of Fig. 9 welded or brazed together in part only. Fig. 13 shows the piece of Fig. 12 with the arms opened apart. Fig. 14 shows the forging of Fig. 13 with its arms brought together and united by riveting or the like. Figs. 15, 16, and 17 show the forging in different stages of a modified method of manufacture.

The object of this invention is the production of the movable jaw of a wrench, which is accomplished by the process hereinafter set forth, and illustrated in the drawings, the same involving the use of four sets of dies and their operation upon a bar of stock, the first set operating on a plain bar, the second set on the stock as it comes from the first set, and so on. For this reason I necessarily use the several sets of dies in combination or conjunction with each other, the faces of each set save the first being so shaped as to act on stock already partially formed.

The first set of dies 1 2 and the original bar of stock 3 are shown in Fig. 1. The upper die 1 has two punches 4 and 5, which produce the cavities 6 and 7 shown in the stock 30 of Fig. 3, leaving two projections 190 and 170, respectively, in front and in rear of the cavity 6. The lower die 2 has a socket 8 to produce the peen 9 (shown in Fig. 3) and is recessed at 10 to admit the shoulder 11 of the stock, as also seen in Fig. 3. Fig. 2 is a sectional view showing the operation of the dies 1 and 2 on the plain stock 3, and in Fig. 3 is shown the partially-formed stock-bar produced by the first set of dies.

The second set of dies 12 and 13 is shown in Figs. 3 and 4. The upper die has two lugs 14 on its face, and the lower die has two sockets 15 corresponding in width with the projections 190 and 170 and with the lugs 14; but, as best seen in Fig. 4, the length of each socket is considerably greater than that of each lug and somewhat greater than that of the projection which is to enter the socket. The lug is so shaped that in its operation, Fig. 6, it lengthens out the projections 190 and 170 and forms them into flattened arms 19 and 17, having ears 38 at their extremities, as seen in Figs. 5 and 7.

The third set of dies 22 and 23 is shown in Fig. 7, together with the stock 300 as just completed by the second set, and the stock 3,000, produced by this third set, is shown in Fig. 8. The upper die 22 here has a long rounded nose 24, shouldered and reduced somewhat at one end, as at 25, and has a lateral rounded offset 26 at the other end, and at one side of this nose is the flat shoulder 27. The lower die, again, has the deep socket 8 for the peen 9 and a longitudinal mortise transversely rounded at its center, as at 31, and slightly deeper and flattened at its ends, as at 32, these lateral portions receiving the backs of the arms 19 and 17. To one side of the mortise 31 is a flat shoulder 33 to coöperate with that numbered 27 above, and the latter extends over the deeper portions 32, as will be clear. The extremities of these deeper portions are rounded, as at 34, so as to finish the ears 38, and the other extremity of the deeper portion which acts on the arm 19 is curved outward, as at 18. The product 3,000, produced by this third set of dies, has the peen 9 nicely formed, as seen in Fig. 8, its arms still further flattened and their ears rounded on their outer extremities, and the edge of its body flattened, as at 37; but said body is now provided with a rounded internal cavity 35, produced by the nose 24, with a rounded outlet 53 at one end, produced by the shoulder 25, and an offsetting-cavity 40 at the other end, produced by the offset 26 within the peen, so that the latter is hollow. The outside of this body portion is now rounded, as at 36, with the back of the peen somewhat rounded and finished off, so that the arms 17 are flush with its sides, and the opposite end of the body rounded and made a little thicker, as at 360 in Fig. 11, and so that the arms 19 appear like a strap surrounding the same. This third set of dies might carry a suitable knife to cut the wrench-jaw from the stock 3,000 on the dotted line 3,001, or such cutting could be done by hand or otherwise.

It is to be understood that the product thus produced is made in opposing and complementary halves, as seen in Fig. 9, and these may be welded together, as in Fig. 10, and the burs 51 sheared off; or these halves may be welded or brazed together at their upper portion only, as in Fig. 12, and the arms bent outward into the form shown at 30,000 in Fig. 13. However, this step and the dies which accomplish it form parts of a companion application serially numbered 56,774 and filed by me on April 20, 1901, and no claim thereon is made in the present case. The ears may be riveted together, as seen at 50. The hole 53 must be tapped with a screw-thread for the entrance of the screw by which the movable jaw is operated along the shank 55 toward and from the fixed jaw 56. It will be understood by those skilled in the art to which this improvement appertains that the stock is suitably heated at intervals in this process and that fins when they occur are sheared off at the proper times.

It is well known to those skilled in the art that it is not necessary to provide separate sets of die-blocks for each operation in this process, as it is customary in drop-forging work in order to save the cost of an extra drop to cut into a single set of die-blocks the impressions for two successive steps in the operation.

What is claimed as new is—

1. The improvement in the process of making wrought-metal wrench-jaw halves consisting in first subjecting the plain stock-bar to the action of a set of dies which produce two projections on one edge thereof and one projection on the opposite edge; then subjecting the product of said first set of dies to the action of a second set of dies which lengthen and flatten said two projections and produce side ears at their outer extremities; and then subjecting the product of said second set of dies to mechanism which shapes the exterior of the body and produces on its inner face a cavity with a reduced outlet for the jaw-operating screw; all substantially as described and for the purpose set forth.

2. The improvement in the process of making wrought-metal wrench-jaw halves consisting in first subjecting the plain stock-bar to the action of a set of dies which produce two projections on one edge thereof and one projection on the opposite edge; then subjecting the product of said first set of dies to the action of a second set of dies which lengthen and flatten said two projections and produce side ears at their outer extremities; and then subjecting the product of said second set of dies to the action of a third set of dies which shape the exterior of the body and produce on its inner face a cavity with a reduced outlet for the jaw-operating screw; all substantially as described and for the purpose set forth.

3. The improvement in the process of making wrought-metal wrench-jaws consisting in first subjecting the plain stock-bar to the action of a set of dies which produce two projections on one edge thereof and one projection on the opposite edge; then subjecting the product of said first set of dies to the action of a second set of dies which lengthen and flatten said two projections and produce side ears at their outer extremities; then subjecting the product of said second set of dies to the action of a third set of dies which shape the exterior of the body and produce on its inner face a cavity with a reduced outlet for the jaw-operating screw; and finally assembling two complementary jaw-halves thus formed and connecting their bodies and their several ears; all substantially as and for the purpose set forth.

4. The improvement in the process of making wrought-metal wrench-jaws consisting in first subjecting the plain stock-bar to the action of a set of dies which produce two projections on one edge and one projection on the opposite edge; then subjecting the product of said first set of dies to the action of a second set of dies which lengthen and flatten said two projections and produce side ears at their outer extremities; then subjecting the product of said second set of dies to the action of a third set of dies which shape the exterior of the body and produce on its inner faces a cavity for the jaw-operating screw; and finally assembling two complementary jaw-halves thus formed and welding their bodies and their several ears together; all substantially as and for the purpose set forth.

PARDON A. WHITNEY.

Witnesses:
H. E. HART,
D. I. KREIMENDAHL.